No. 12,350. REISSUED MAY 23, 1905.

Z. B. WEBB.

FOLDING BOX.

APPLICATION FILED FEB. 4, 1903.

Attest:
T. F. Kehoe
W. H. Kennedy

Inventor:
Zaida B. Webb
by Philipp Sanger Rice & Kenner
Attys

No. 12,350. Reissued May 23, 1905.

UNITED STATES PATENT OFFICE.

ZAIDA B. WEBB, OF FLORHAM PARK, NEW JERSEY, ASSIGNOR, BY MESNE ASSIGNMENTS, TO WEBB FOLDING BOX COMPANY, OF NEWARK, NEW JERSEY, A CORPORATION OF NEW JERSEY.

FOLDING BOX.

SPECIFICATION forming part of Reissued Letters Patent No. 12,350, dated May 23, 1905.

Original No. 690,497, dated January 7, 1902. Application for reissue filed February 4, 1903. Serial No. 141,932.

*To all whom it may concern:*

Be it known that I, ZAIDA B. WEBB, of Florham Park, Morris county, New Jersey, have invented certain new and useful Improvements in Folding Boxes, of which the following is a full, clear, and exact description.

My invention relates to improvements in folding boxes of the kind especially that are made of a single piece without glue; and the object of my invention is to produce a very simple and easily-operated box which can be conveniently knocked down or set up, and especially to produce engaging flaps which are adapted to turn in over the box-top to protect the contents of the box and which are adapted by simply placing them in engagement to lock the box and hold the contents secure against ordinary spilling.

To these ends my invention consists of certain features of construction and combination of parts, which will be hereinafter fully described and claimed.

Reference is to be had to the accompanying drawings, forming part of this specification, in which similar figures of reference refer to similar parts in both views.

Figure 1:
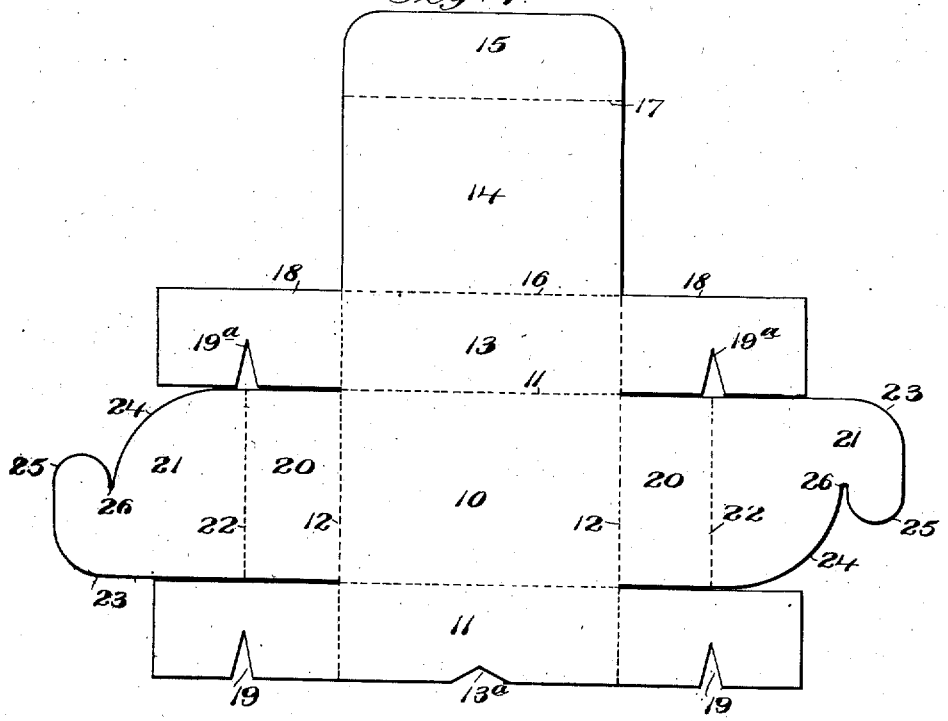
Figure 2:
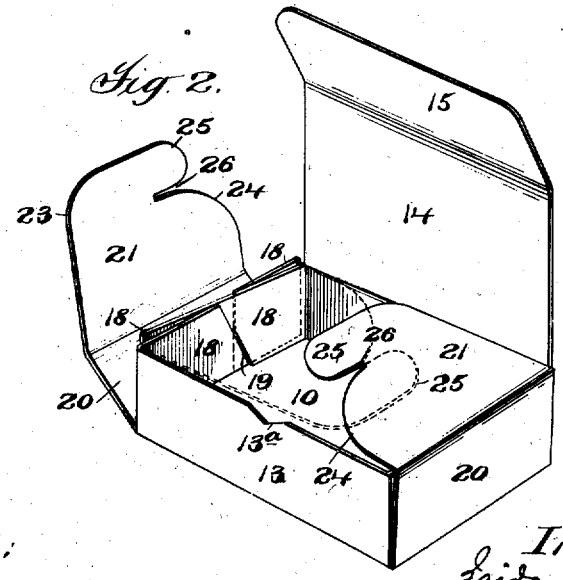

Figure 1 is a development of the blank, and Fig. 2 is a perspective view of the open box.

The box has a rectangular bottom 10, the two sides of which are bounded by the score-lines 11 and the two ends by the score-lines 12, these latter being prolonged so as to extend across the side pieces 13, which are adapted to turn up to form the box sides and one of which has the customary finger-notch 13[a]. One of the side pieces is prolonged to form a top or cover 14, which has the usual terminal flap or tongue 15 to tuck inside the box, and the top is separated from the side pieces by a score-line 16 and the flap 15 from the top by the score-line 17, although it will of course be understood that wherever score-lines are shown they may be dispensed with without affecting the principle of the invention. The side pieces 13 have at the ends flaps 18, which are adapted to fold inward to assist in forming the box ends, and one set of these flaps is notched on the outer or upper side, as at 19, the notches extending practically half-way across the flaps, and the other set of flaps is notched on the inner or under side, as shown at 19[a], so that when brought into essentially parallel positions and perpendicular to the box-bottom they may interlock, as shown clearly in Fig. 2, and the flaps will thus be held together and will hold the box upright. This feature, though shown and described, is not claimed as novel, except so far as it may form a part of the particular combination between the box ends and the interlocking flaps, to be hereinafter referred to.

Projecting from the end edges of the box-bottom are end pieces 20, which are adapted to turn up to form the box ends, and these end pieces are each provided with a flap 21, which is separated therefrom, preferably by a score-line 22, this being coincident with the top edge of the box when the box is set up, and the flap 21 is relatively straight along one edge, as shown at 23, may be curved inward and cut away on the other edge, as at 24, and is finally provided with a laterally-extending tongue 25, the tongue being produced by cutting inward into the flap 21 on a line nearly parallel with the score-line 22. By reference to Fig. 1 it will be noticed that the relatively straight side 23 of one flap 21 is on the opposite edge to that of the other corresponding flap, and consequently the locking-tongues 25 of the two flaps extend in opposite directions, so that when the flaps are bent over the box-top the tongues may be interlocked, as shown in full and dotted lines in Fig. 2, and when thus interlocked the box is held secure and its contents cannot well be spilled.

To set up the box, the side pieces 13 are turned up, the flaps 18 turned inward at right angles to the side pieces, and the flaps of each end interlocked, as described, after which the end pieces are turned up and the flaps 21 can be turned into the box.

It will be noticed that this makes a very neat package and an exceptionally secure one, as after the tongues 25 are interlocked, the cover 14 turned down, and the flap 15 tucked in between the box contents and the front wall 13 of the box all the parts are held in a particularly tight and secure relation to each other. Furthermore, the package produced is one perfectly smooth on all sides and is therefore an attractive one.

It will be observed that the locking-flaps 21, with their engaging tongues, can be made on other box ends or sides, so as to extend across and lock over the box-top, and that the other details of construction can be departed from without affecting this feature, which is the essential one of the invention. It will also be noticed that as the relatively straight edges 23 of the locking-flaps 21 come on opposite sides of the box the engaging flaps will form a practically complete and continuous inner cover for the box, as shown clearly in Fig. 2.

Having thus described my invention, what I claim as new, and desire to secure by Letters Patent, is—

In a folding box the combination of the bottom portion, pieces extending from the four edges of the bottom portion to form the side and end walls of the box, two of said wall-pieces extending from opposite edges of the bottom portion having flaps adapted to fold inward inside the other wall-pieces, and said other wall-pieces having flaps extending from their free edges and adapted to fold downward and to form an inner cover, and each of said flaps being formed substantially straight on one side and with a terminal laterally-extending tongue on the other side, so that when the two flaps are engaged their straight edges will come along opposite sides of the box and the opposed tongues will engage each other, and a cover-piece extending from one of the two first said wall-pieces adapted to fold down over the flaps forming the inner cover, said cover-piece having a holding-tongue on its free edge.

In testimony whereof I have signed my name to this specification in the presence of two subscribing witnesses.

ZAIDA B. WEBB.

Witnesses:
W. H. KENNEDY,
A. L. KENT.